(12) United States Patent
Kjær et al.

(10) Patent No.: US 10,451,038 B2
(45) Date of Patent: Oct. 22, 2019

(54) INCREASING ACTIVE POWER FROM A WIND TURBINE

(71) Applicant: VESTAS WIND SYSTEMS A/S, Aarhus N (DK)

(72) Inventors: Martin Ansbjerg Kjær, Harlev J (DK); Eik Herbsleb, Odder (DK); Jan Vestergaard Knudsen, Odder (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/738,170

(22) PCT Filed: Jun. 22, 2016

(86) PCT No.: PCT/DK2016/050215
§ 371 (c)(1),
(2) Date: Dec. 20, 2017

(87) PCT Pub. No.: WO2016/206698
PCT Pub. Date: Dec. 29, 2016

(65) Prior Publication Data
US 2018/0171977 A1 Jun. 21, 2018

(30) Foreign Application Priority Data
Jun. 26, 2015 (DK) .................. 2015 70399

(51) Int. Cl.
*F03D 7/00* (2006.01)
*H02J 3/00* (2006.01)
(Continued)

(52) U.S. Cl.
CPC ......... *F03D 7/0284* (2013.01); *F03D 7/0224* (2013.01); *F03D 7/0276* (2013.01);
(Continued)

(58) Field of Classification Search
CPC ........... F03D 7/048; Y02E 10/74; H02J 3/386
See application file for complete search history.

(56) References Cited

U.S. PATENT DOCUMENTS

| 4,297,076 A | 10/1981 | Donham et al. |
| 4,339,666 A * | 7/1982 | Patrick .................. F03D 7/0224 290/44 |

(Continued)

FOREIGN PATENT DOCUMENTS

| CN | 103306895 A | 9/2013 |
| CN | 104662289 A | 5/2015 |

(Continued)

OTHER PUBLICATIONS

PCT International Search Report for Application No. PCT/DK2016/050215 dated Jun. 22, 2016.
(Continued)

*Primary Examiner* — Ronald D Hartman, Jr.
(74) *Attorney, Agent, or Firm* — Patterson + Sheridan, LLP

(57) ABSTRACT

The present invention relates to a method for controlling a wind turbine, the wind turbine comprises a rotor connected to a generator, and a rotational speed controller configured to control a speed of the rotor in response to a generator speed reference, and a power controller to control an electric power production, the method comprises the step for receiving a boost command to request a power boost event, so to increase the electrical power production, and imposing a dead band with a dead zone value limit to the rotational speed controller, and wherein the dead band imposes a zero signal to be send to the rotational speed controller, when a speed error is within the dead zone value limit and wherein the dead band imposes an error signal to be send to the rotational speed controller, when a speed error is greater than the dead zone value limit, the error signal being a function
(Continued)

of the speed error and the dead zone value limit. The invention also relates to a wind power plant comprising a power plant controller and at least one wind turbine with a control system according to the above mentioned method.

15 Claims, 7 Drawing Sheets

(51) Int. Cl.
*F03D 7/02* (2006.01)
*H02J 3/38* (2006.01)
*F03D 7/04* (2006.01)
*G05B 19/042* (2006.01)

(52) U.S. Cl.
CPC ......... *F03D 7/043* (2013.01); *G05B 19/042* (2013.01); *H02J 3/386* (2013.01); *F05B 2220/706* (2013.01); *F05B 2270/101* (2013.01); *F05B 2270/104* (2013.01); *F05B 2270/327* (2013.01); *F05B 2270/328* (2013.01); *F05B 2270/337* (2013.01); *F05B 2270/705* (2013.01); *G05B 2219/2619* (2013.01); *Y02E 10/723* (2013.01); *Y02E 10/725* (2013.01); *Y02E 10/74* (2013.01); *Y02P 80/114* (2015.11)

(56) References Cited

U.S. PATENT DOCUMENTS

| | | | |
|---|---|---|---|
| 4,994,684 A | 2/1991 | Lauw et al. | |
| 2005/0040655 A1* | 2/2005 | Wilkins | F03D 7/02 290/44 |
| 2009/0129924 A1* | 5/2009 | Rebsdorf | F03D 7/0224 416/43 |
| 2009/0295162 A1* | 12/2009 | Oohara | F03D 7/028 290/44 |
| 2010/0308585 A1* | 12/2010 | Jorgensen | F03D 7/0284 290/44 |
| 2012/0104756 A1 | 5/2012 | Beekmann et al. | |
| 2015/0120070 A1* | 4/2015 | Tarnowski | H02J 3/386 700/287 |
| 2015/0240784 A1* | 8/2015 | Sagi | F03D 7/048 700/287 |
| 2015/0285220 A1* | 10/2015 | Hiromasa | F03D 7/048 290/44 |
| 2016/0069323 A1* | 3/2016 | Arlaban Gabeiras | F03D 7/0276 416/1 |
| 2016/0305404 A1* | 10/2016 | Esbensen | F03D 7/042 |
| 2017/0025855 A1* | 1/2017 | Garcia | H02J 3/16 |
| 2017/0133852 A1* | 5/2017 | Macdonald | H02J 3/382 |
| 2019/0003456 A1* | 1/2019 | Garcia | F03D 7/0284 |

FOREIGN PATENT DOCUMENTS

| | | |
|---|---|---|
| JP | 2015042867 A | 3/2015 |
| WO | 2010/086031 A2 | 8/2010 |
| WO | 2010/086032 A2 | 8/2010 |
| WO | 2010108910 A2 | 9/2010 |
| WO | 201263355 A1 | 5/2012 |
| WO | 2012163355 A1 | 12/2012 |
| WO | 20140020157 A2 | 2/2014 |
| WO | 2016206698 A1 | 12/2016 |

OTHER PUBLICATIONS

Danish Patent and Trademark Office Search Report for Application No. PA 2015 70399 dated Mar. 7, 2016.
PCT Written Opinion of the International Searching Authority for Application No. PCT/DK2016/050215 dated Jun. 22, 2016.
Chinese Office Action for Application No. 201680037680.1 dated Dec. 21, 2018.

\* cited by examiner

INCREASING ACTIVE POWER FROM A WIND TURBINE

FIELD OF THE INVENTION

The invention relates to control of a wind turbine, particularly in connection with power boosting or fast increase of active power production.

BACKGROUND OF THE INVENTION

High penetration of wind turbines in the electrical grids has let requirements for the wind turbines, on how they should contribute to the stability of the electrical grids, such requirements are included in so-called grid codes.

One of the requirements which may be included in certain grid codes is inertia response. Inertia response is a functionality where the power is boosted from the normal production for a short period of time, i.e. power delivered to the electrical grid is increased. The boost of power function may be available at all wind speeds, for very low wind speeds, the power boost may be rather reduced.

Depending on the grid code, the details of the boost phase may vary. In some locations a boost power should be provided upon request. In an example it may be specified that whenever the production from the wind power plant is above 25% of rated power, the wind power plant has to be able to deliver a power boost of 5-10% of rated power for a given time period, e.g. up to 10 seconds. The grid code may also specify requirements for the recovery period. As an example, after the boost it may be specified that the turbine must have returned to normal operation after 2 minutes, and that during the recovery phase, the power produced by the wind turbine should remain within 80% of available power.

Many of the boost power methods known from the prior art suffer from various elements such as complex calculation algorithm, transient behavior when the wind turbine goes from partial-load wind conditions to full load conditions, and not at least difficulties during the recovery phase.

The present invention provides a solution to circumvent at least some of the problems with the prior art.

SUMMARY OF THE INVENTION

It is an object of the present invention to provide a method and a system to increase power production from a wind turbine for a period of time. In a further object of the invention, the method and system in respect of the power increase operates indifferent of the amount of power produced by the wind turbine.

In a first aspect, the present invention relates to a method for controlling a wind turbine, the wind turbine comprises a rotor connected to a generator, and a rotational speed controller configured to control a speed of the rotor in response to a generator speed reference, and a power controller to control an electric power production, the method comprises the step of:
receiving a boost command to request a power boost event, so to increase the electrical power production,
imposing a dead band with a dead zone value limit to the rotational speed controller,
wherein the dead band imposes a zero signal to be send to the rotational speed controller, when a speed error is within the dead zone value limit and
wherein the dead band imposes an error signal to be send to the rotational speed controller, when a speed error is greater than the dead zone value limit, the error signal being a function of the speed error and the dead zone value limit.

One advantage of the present aspect is that operating the wind turbine generator below rated wind speed or above rated speed is indifferent in respect of present method, the needed reduction of rotational speed is handled "automatically" by the physics for any wind condition (turbulence, shear, etc.). Other methods requires a switch or transition when switching between full load operation and part load operation, as the additional boost power moves the operation from full load to partial load.

According to one embodiment of the invention the function of the dead zone value limit is set in relation to the boost command.

An advantage of this embodiment is that the function may depend on the actual demand for active power boost, thus for a large demand a deep dead zone is required, although that the actual rotor speed may be taken into account.

According to one embodiment of the invention, the wind turbine generator comprises a pitch system configured to adjust a pitch angle of a blade of the rotor, and the method further comprises the step of
adjusting the pitch angle of the pitch system to control the rotational speed of the rotor and/or the electrical power production.

According to one embodiment of the invention the step of receiving the boost command comprises:
receiving a request for increased power production,
calculating a dead zone value limit based on an actual generator speed and at least one other parameter,
passing the request for increased power production to the power controller.

According to one embodiment of the invention comprises the step of:
returning the wind turbine gradually to normal operational mode normal operational mode by increasing the rotational speed.

According to one embodiment of the invention a dead zone value limit is held for a predetermined period of time before the speed is ramped back before the speed is ramped back to follow a speed reference without the dead band.

According to one embodiment of the invention the predetermined period of time is in a range of 2 seconds to 15 seconds.

An advantage of this embodiment is that the operator of the wind turbine can predict when the wind turbine is back at normal operation after a boost event.

According to one embodiment of the invention the speed is ramped back at a predetermined ramp rate.

An advantage of this embodiment is that the speed is brought back to normal operational mode without transient behavior of the rotor. Thus high load are avoided.

According to one embodiment of the invention the predetermined ramp rate is in a range of 0.025 RPM/s to 0.2 RPM/s.

According to one embodiment of the invention the step of returning the wind turbine to normal operational mode is triggered by a boost stop command signal.

An advantage of this embodiment is that the method can aboard the power boost event by a command signal if requested.

In a second aspect, the present invention relates to a control system for a wind turbine arranged to receive a boost command from an external controller to request a power boost event, the wind turbine comprises a rotor connected to a generator configured to generate electrical power dependent on a power reference and the boost command, the control system comprises a rotational speed controller arranged to control the speed of the generator, based on a speed error, a dead band block within the rotational speed controller arranged to impose a dead band, with a dead zone value limit, to the rotational speed controller in response to the boost command, wherein the dead band is arranged to send a zero signal to the rotational speed controller, when the speed error is within a dead zone value limit, and wherein the dead band is arranged to send an error signal, where the error signal is a function of the error and the dead zone value limit, to the rotational speed controller, when the speed error is greater than the dead zone value limit.

According to one embodiment of the invention a wind power plant comprising a power plant controller and at least one wind turbine with a control system according to second aspect of the invention, the power plant controller being arranged to send a power set point to the at least one wind turbine, wherein the power set point includes an increased power reference or a boost command.

In a third aspect, the present invention relates to a computer program product loadable into an internal memory of a processing device, the computer program product comprising software code portions for performing the steps of the method according to the first aspect.

DESCRIPTION OF THE EMBODIMENTS

The present invention will now be explained in further details.

Figure 1:
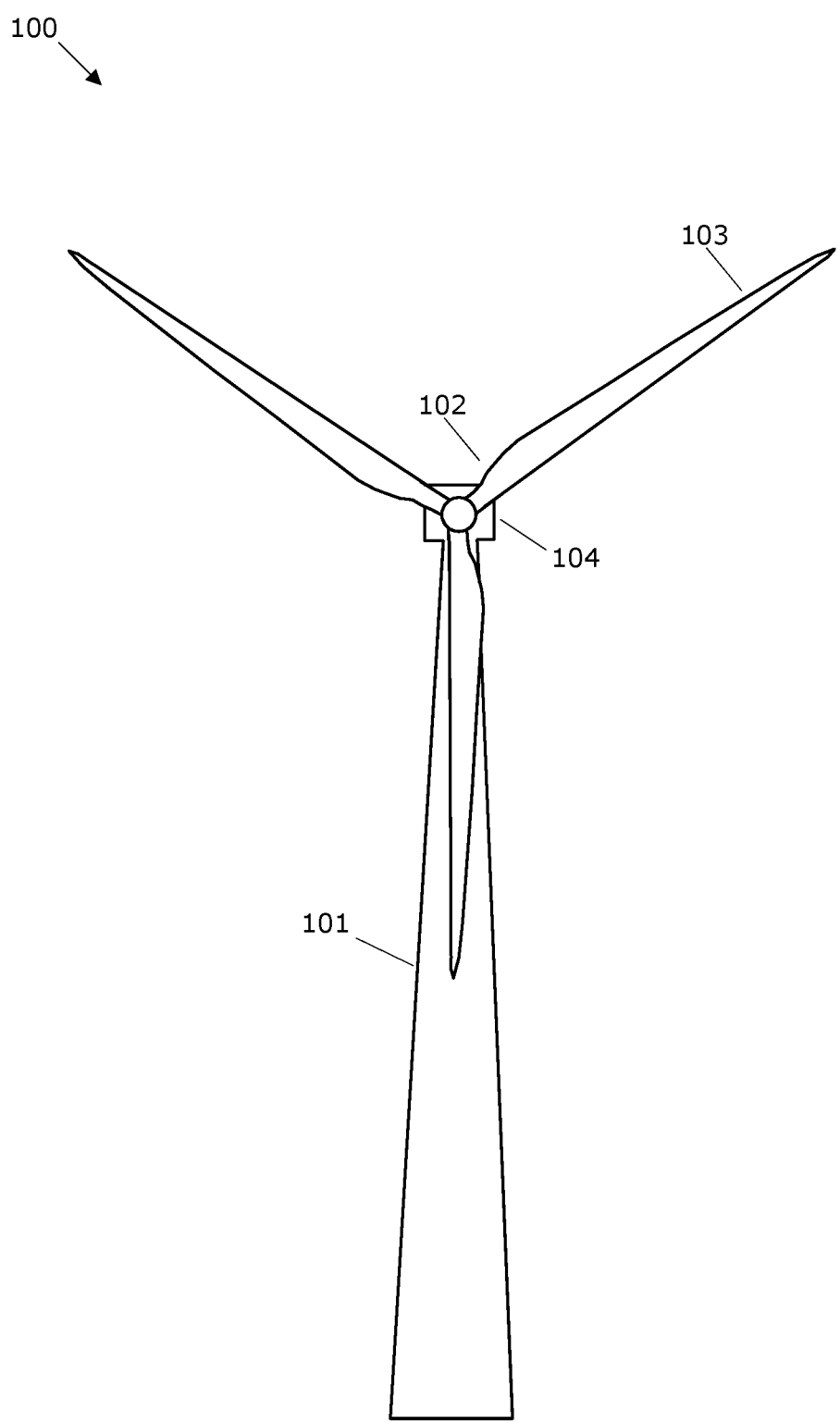
FIG. 1 shows a wind turbine.

FIG. 1 shows a wind turbine 100 (WTG) comprising a tower 101 and a rotor 102. The rotor comprises three rotor blades 103 however the number may vary, such as two, four or even more blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The electrical layout of the wind turbine may in addition to the generator include a power converter. The power converter is connected in series between the generator and the electrical grid for converting the variable frequency generator AC power into a grid frequency AC power to be injected into the utility grid. The generator is via the power converter controllable to produce a power corresponding to a power request.

The blades 103 can be pitched in order to alter the aerodynamic properties of the blades, e.g. in order to maximize uptake of the wind energy. The blades are pitched by a pitch system, which includes actuators for pitching the blades dependent on a pitch request.

A wind turbine is, in normal operation, set to capture as much power from the wind, at any given wind speed, this works as long as the power production is below the rated power limit for the wind turbine, i.e. partial load operation. When the wind speed increases above rated wind speed, often designed at 10-12 m/s, the wind turbine has to pitch the blades 103, so the energy captured is stable at rated power, even if the wind is well above rated wind speed.

To ensure as much as possible energy yield, during partial load, the electric power setpoint Preq is set such that a tip speed ratio, $\lambda$ for the rotor 102, is maintained at its optimal value, $\lambda_{opt}$.

Terms like tip speed ratio and optimal tip speed ratio are known to the skilled person.

The partial load state may be selected if the wind speed is not high enough to enable generation of the nominal or rated electrical power from the generator. In this state the pitch $\theta$ and the generator speed are controlled to optimize aerodynamic efficiency of the wind turbine 100. Therefore, the pitch request θreq may be set to an optimum pitch reference θopt which maximises the aero-dynamic efficiency of the rotor. The generator speed ωr may be controlled to extract as much power as possible by tracking the desired generator speed ωref. In the partial load state the generator speed ωr is controlled via the power request Preq which affects generator torque.

Accordingly, in partial load, the partial load controller calculates the power request Preq that minimises the difference between the generator speed reference ωref and the measured generator speed ωm.

The full load state may be selected if the wind speed v is high enough to enable generation of a rated electrical power. Therefore, the generator speed and generator power may be controlled to achieve a desired power production, e.g. a rated power or a reduced power. The power request Preq is set to the desired power production. The generator speed reference ωref may be determined dependent on the desired power production and possibly limited to a maximum rated speed. In the full load state the generator speed ωr is controlled via the pitch request ωreq.

Accordingly, in full load, the full load controller 204 calculates the pitch request θreq that minimises the difference between the generator speed reference ωref and the measured generator speed corn.

The rated power level is the power level that the wind turbine is designed to generate at or above rated wind speed. In some circumstances, the wind turbine may be operated to generate a maximum power, which is higher than the rated power, when this increases is for a short period of time it is called at boost event.

Figure 2:
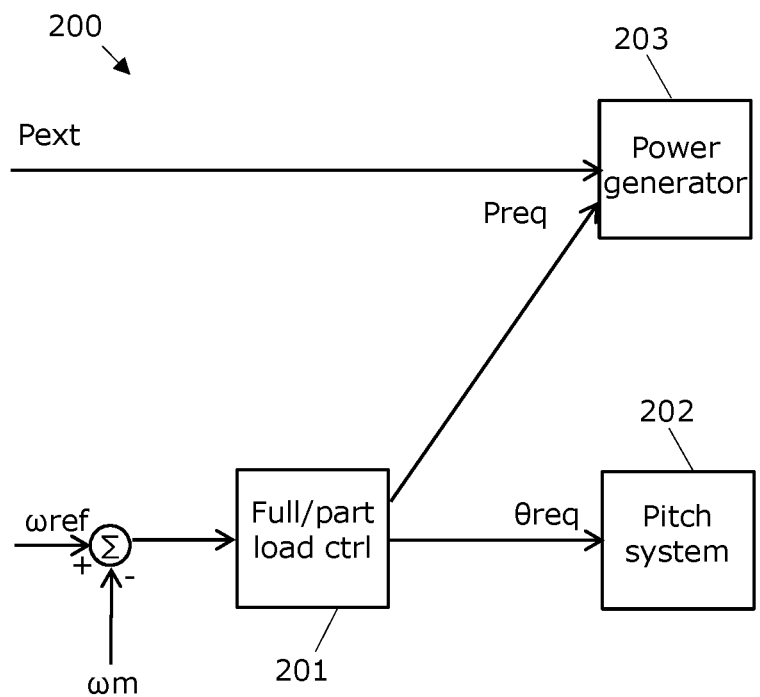
FIG. 2 shows a control system of the wind turbine where the control system is in partial and full load state.

FIG. 2 shows an example of a flow chart of a general full load and partial load controller 200 for a wind turbine.

The control system of the wind turbine comprises a full/partial load controller 201. The full load mode is activated in the full load state to determine the pitch request θreq for the pitch system 202. During full load the pitch request is determined dependent on a difference between a generator speed reference ωref and a measured generator speed ωm.

The control system of the wind turbine also comprises a partial load state, which is activated in a partial load state to determine the power request Preq for the power generator. During partial load, the power request is determined dependent on a difference between the generator speed reference ωref and the measured generator speed ωm.

During full load the generator request Preq is determined based on an external power reference Pext and, therefore, the partial load controller may be inactivated during full load control. For example, the generator request Preq may be set equal to the external power reference Pext. The external power reference Pext may be provided by a grid operator or other source such as power plant controller communicating with a plurality of wind turbines, e.g. power plant controller configured to compensate grid frequency changes.

When a grid operator continuously request Pext which is greater than Preq in partial load, there will be a power error, as the wind turbine is limited to energy available in the wind at the given wind speed.

The generator request Preq is supplied to the power generator 203. The power generator may contain a generator controller which receives the generator request Preq and controls the generator to produce the requested power Preq. Accordingly, the power generator may be defined as a power generator system containing the generator controller, the generator, power converters/inverters and other units and which is configured to produce power according to the requested amount.

The pitch request θreq is supplied to the pitch system 202 which performs pitch adjustment of the blades 103. The pitch system may contain a pitch controller with receives the pitch request θreq and controls the pitch actuators to set the pitch to the requested pitch.

It is noted that the generator speed car and the rotor speed are linked by the gear ratio of the gear connecting the rotor with the generator shaft. Accordingly, the generator speed reference ωref and may equivalently be set as a rotor speed reference and a measured rotor speed may equivalently be used instead of a measured generator speed.

In an embodiment there is no gear box between the rotor 102 and the electrical power generator 203, thus there will be no gear ratio, and the rotational speed of the rotor 102 and generator 203.

The rotational speeds and speed ramps mentioned here is translated to the aero dynamical rotor side.

It is also noted that the power generator 203 may equivalently be controlled by means of a torque request instead of the power request Preq. Accordingly, it is understood that the power request Preq may be a power or torque set point for the power generator 203.

The wind turbine may be operated in a de-rated mode in the full load configuration 200, i.e. in a mode where the power request Preq is set to a reduced power reference.

The de-rated mode can also be practiced in partial load mode, where the partial controller sets a Preq which is de-rated in respect of the optimal power for a given wind speed.

The de-rated mode is also referred to as a reduced power mode or curtailed power mode. The reduced power reference may be any power, which is lower than the rated power of the wind turbine. In the de-rated power mode, the pitch is controlled according to a generator speed reference ωref which may be de-rated, i.e. reduced, or not depending on the design of the wind turbine. The generator speed reference ωref may be set from a predefined power-speed relation.

Thus, the de-rated power mode refers to a situation where the wind turbine is operated to produce a reduced amount of power, i.e. a situation where the wind turbine is controlled to produce an amount of power, which is lower than power that can be produced with the available wind power.

For example, the wind turbine may be operated in a de-rated mode in order to establish a power reserve that can be released quickly e.g. if a problem with the grid arises. Accordingly, at demand, the wind turbine has to ramp the power very fast back to full production.

It is noted that the configuration 200 is only an example and that a wind turbine may be configured in other ways to achieve control of pitch and power and to achieve de-rated power production.

As mentioned earlier it is important for grid operators to be able to request additional power from a wind turbine or a plurality of wind turbines, in order inject power into the electrical grid, this may occur during a low frequency event, where additional active power will help getting the grid frequency back to a better state.

Although that de-rating can be seen as a solution it also requires the wind turbine to operate at a de-rated value for the majority of the operating hours, thus another solution is desirable.

As a wind turbine has a large rotor plane 102 with large blades 103, a large amount of kinetic energy is stored in the rotor 102 as rotor inertia, the rotational energy can be released by extracting more power, which then results in a reduction in the rotational speed of the rotor 102, and converting the mechanical energy into electrical power in the generator. Such an event is boost power event, as the power is boosted in a short period.

In general it is more difficult to perform a boost power event when the wind turbine is running in partial load operation as the produced power is according to the actual wind speed, i.e. rotor is running at optimal tip speed, harvesting whatever power is available, at the present wind speed.

At full load operation it is somewhat simpler, as the wind provides more power than captured by the rotor 102, i.e. the pitch angle of the blades are set so the blades 103 are pitched out of maximum wind.

There are different methods to control the turbine under the boost power event.

Common for all power boost methods is that the power is increased in the boost phase, upon request, for a period of time, as a consequence, the rotational speed of the rotor goes down at least in partial load operation. The boost phase is followed by a recovery phase, where the rotational speed is brought back to a speed setting, which is normal for the wind turbine at the given power production level and present wind speed. The recovery phase often takes much longer time than the boost phase, in the recovery the power may drop in order to build up kinetic energy in the rotor 102. It is important that the power production during the recovery doesn't drop too much, otherwise it may cause further stability problems in the electrical grid.

Figure 3:
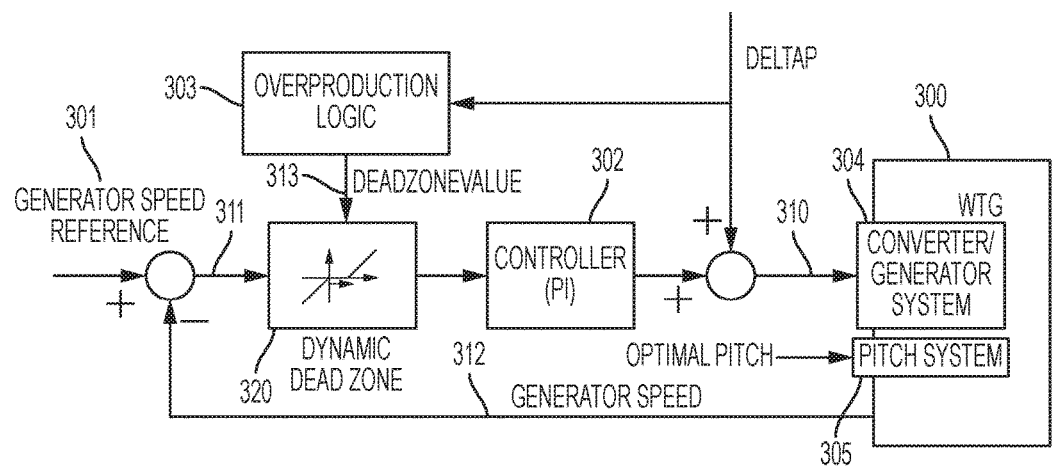
FIG. 3 shows a block diagram of the controller.

FIG. 3 shows elements of an embodiment of the present invention, where the wind turbine is operated with a speed dead-zone. This method has several advantages compared to other methods.

A block diagram of the speed dead zone method is illustrated in FIG. 3.

A Power Plant Controller sends a boost level 308 to the wind turbine 300. This boost level is added to the output of the partial load controller (PLC) which then becomes the power reference 310 to the converter 304.

The boost command can be send to the wind turbine from a power plant controller, but it can also be initiated by other ways of communication. The command can be a power set point including the present power production, i.e. P_present+DeltaP, or it can be a separate DeltaP command, or as another option it can be binary flag indicating that the wind turbine has to provide a power boost period.

In an embodiment the control system of the wind turbine 100 is arranged so when predefined events occur, the control system initiates the boost command internally. The predefined events can be low frequency measurements at the wind turbine connection terminals to the electrical grid.

In an embodiment the boost level 308 is between 0% and 10% of rated power, larger boost levels 308 may be imposed as well, and will be considered as being within the scope of the present application.

A dynamical dead zone component 320 is inserted on the controller error before it goes into the speed controller 302. In normal operation the dead-zone is zero. When boosting is ongoing, the OverProduction Logic 303 determines a dead-zone value 313 which allows the generator speed to drop, but still insures safe operation and avoids unwanted shutdowns. The dead-zone value is selected so the generator speed drop doesn't go below minimum speed and so mechanical loads of the mechanical components of the wind turbine are within a safe level.

The DeadZoneValue 313 is communicated to the dead-zone component which sends out "zero" from the dynamical dead zone component 320, when the generator-speed error 311 is between zero and the DeadZoneValue 313. The dead-zone component 320 can impose the zone immediately or the dead-zone can be slowly expanded to the DeadZoneValue 313. In fact the dead-zone imposes a dead band on the speed error.

The dead zone value limit can be a predetermined value, but often it will be a variable.

In an embodiment the dead zone value limit is a function of the speed of the rotor, so the dead zone value limit 313 follows the speed error 311 as an envelope function.

In an embodiment the function of the dead zone value limit is set in relation to the boost command, where the length of the boost period and the amount of boost power is taken into account.

In FIG. 3 the speed error 311 is calculated as the difference between a rotational speed measurement 312 and the generator speed reference 301.

The speed controller 302, will control the power reference to the converter 304, according to the output of the dead zone component 520. During the boost phase the boost level 308 adds a DeltaP power level to the converter in the summation block.

Below rated wind speed such power boost event will cause the rotational speed to drop. For higher wind speeds that is what corresponds to rated power plus the boost power, the rotational speed will not drop as sufficient power is present in the wind.

Normally, when the rotational speed drops, the speed controller 302 will decrease the power output to adjust speed, and thus, the boost power would effectively be removed. To avoid this, the dead band is inserted within the speed controller 302 after the error 311 between the rotational speed measurement (i.e. generator speed) and the rotational speed reference 301. This dead band is, if needed, extended at every sample downwards with the dropping measured rotational speed. In this way the boost is not affected.

It is important to maintain the rotational speed of the rotor within a safe area, if the speed drops to low it will not be possible to recover the wind turbine at the end of the boost event, and shutdown may occur.

To protect from especially shutdowns during the boost phase some bounds are put on the dead zone. If a bound (for example, 400 RPM drop of speed) is exceeded the dead zone is simply held at the threshold and the speed controller 302 will start operating. The speed controller 302 will lower the power to maintain the rotational speed at the threshold, and thus, a shutdown due to low speed will be avoided. This situation could easily happen if the wind drops during the boost.

In fact the bound value is the actual speed error 311. When the bound is exceeded the dynamical dead zone block 320 sends a non-zero value to the PLC 302, the non-zero output of the dynamical dead zone block 320 is in fact the speed error 311 subtracted the dead zone value limit 313.

While the speed changes (drops), the pitch controller 305 adjust the pitch to obtain optimal power capture of the rotor.

When the boosting period is over, either it is terminated from power plant controller side, or the maximal time or energy is used, the dead zone must be removed again. In order to avoid large power drops, the input to the speed controller 302 has to change slowly to keep the rotational speed at the reference.

In an embodiment, the lower dead zone point is held for 5 seconds before the speed is ramped back with 0.1 RPM/s. So, for example, for a 0.03 RPM drop, the dead zone will be eliminated after 35 seconds.

In an embodiment, the speed is ramped back with a rate of 0.025 RPM/s to 0.2 RPM/s. preferably about 0.05 RPM/s.

The ramp rate may depend on the wind turbine, especially rated generator speed, as the values mentioned here are generator speed values, which depends on the gearbox ratio. So the for at direct driven wind turbine the ramp rate values that should be applied are much lower.

The present method with the dead zone have the advantage over other methods, where the rotational speed is controlled during the boost period, in that the power is always the same, no matter the wind conditions. On the other hand, with turbulence it is not certain, when running below rated wind speed, i.e. partial load conditions that additional power is actually gained as the wind might pick up during the boost, and thus, speed reduction is not performed. Likewise the wind might drop during the boost and the boost power level becomes too high, for the present state of the wind turbine.

The present method also have the advantage of being simple and reliable. Especially, as it is not necessary to find out whether a speed ramp down is required to boost the power; i.e. for sufficient energy in the wind, the energy should not be taken from the rotor. Therefore, the needed reduction of rotational speed is handled "automatically" by the physics for any wind condition (turbulence, shear, etc.).

The present method keeps the boost "alive" as long as possible, as the dead band sets the speed controller in-active as long as the speed error is within the dead zone value limit 313, this leads to a smooth control in the dead zone.

An advantage of the embodiment is that operating the wind turbine in partial load or in full load condition is indifferent in respect of mode during the boost event. Other methods requires a switch or transition when switching between full load operation and partial load operation. A reason for that switch is that in normal operation the part load controller operates the rotor 102 and its blades 104 at a fixed pitch while the rotational speed is adjusted. In full load operation, the pitch controller is active in order to maintain the power production at a rated power level.

The logic determining the dead zone value limit 313 should take relevant precautions into account. The simplest version is to make sure the speed does not go below a given threshold. However, other restrictions can be imposed as well, such as torque limitations and temperature limitations. Temperature limitation is mainly relevant for the power converter, as the converter may operate close to a temperature limit, and additional overload may push the power converter to trip.

After the boost event, when the rotor speed has to be increased again there are many ways to increase the speed. In general terms the generator speed is ramped back to return to a operational state for producing the highest amount of power possible.

In an embodiment the speed hold period is followed by a very slow speed ramp back to normal operational speed.

In an embodiment the speed increase changes with the derivative of the speed (dRPM/dt) smoothly until a sufficient dRPM/dt (for example 5 RPM/s generator side) has been reached followed by a ramp.

In principle any smooth transition in the rotor speed may be applied as long as transients are avoided.

For the embodiment presented here, it applies that the boost phase during the boost can be terminated if the rotational speed exceeds some specified bounds.

The term power controller is to be understood to cover both a power controller and a torque controller. The power is given as the torque times the rotation, here we have a measurement of the rotation or at least an estimate of the rotation, thus it is straight forward to derive either a power value or a torque value.

Figure 4:
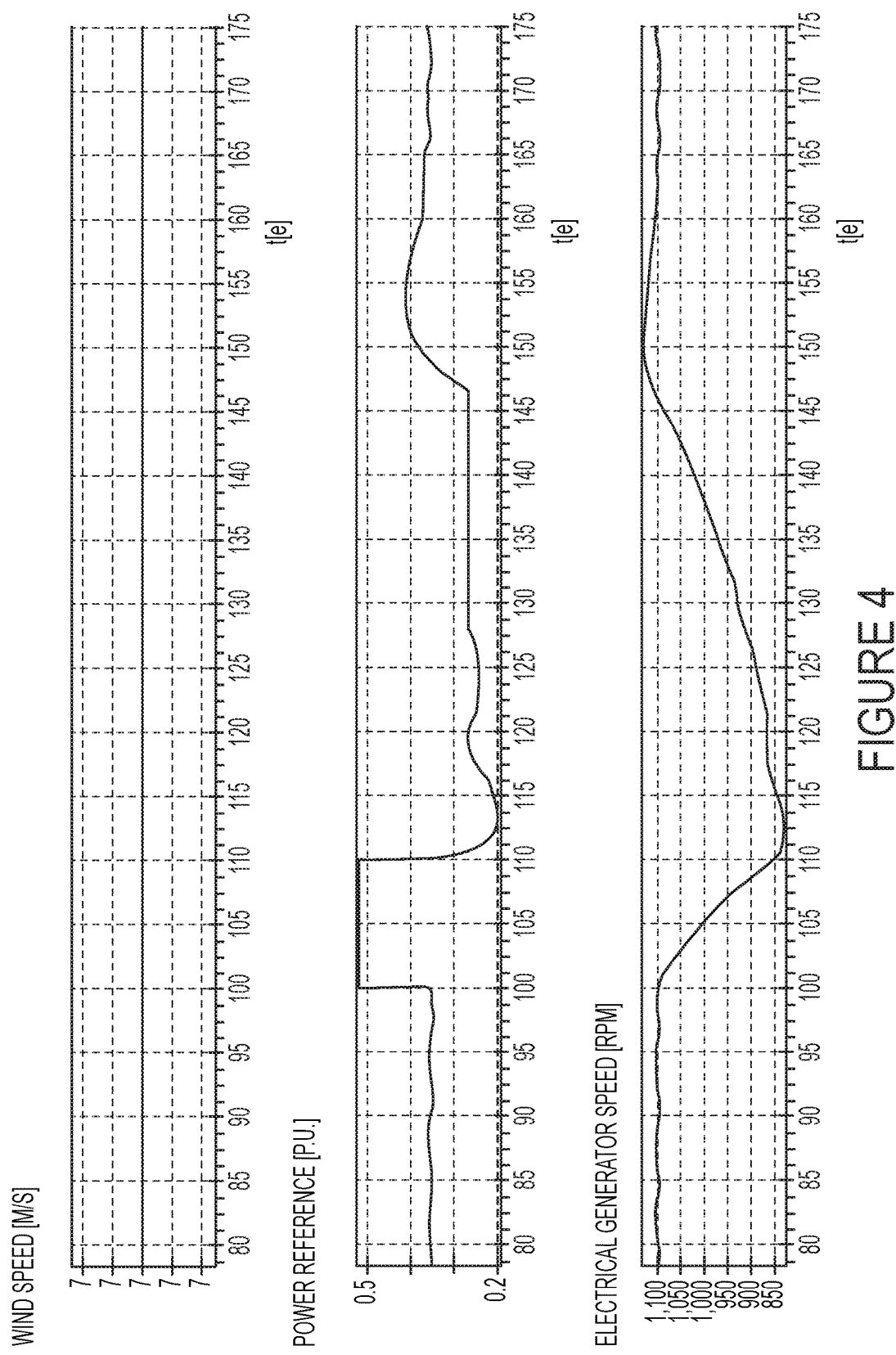
FIG. 4 shows simulations of the method according to the invention, below rated wind speed.
Figure 4:
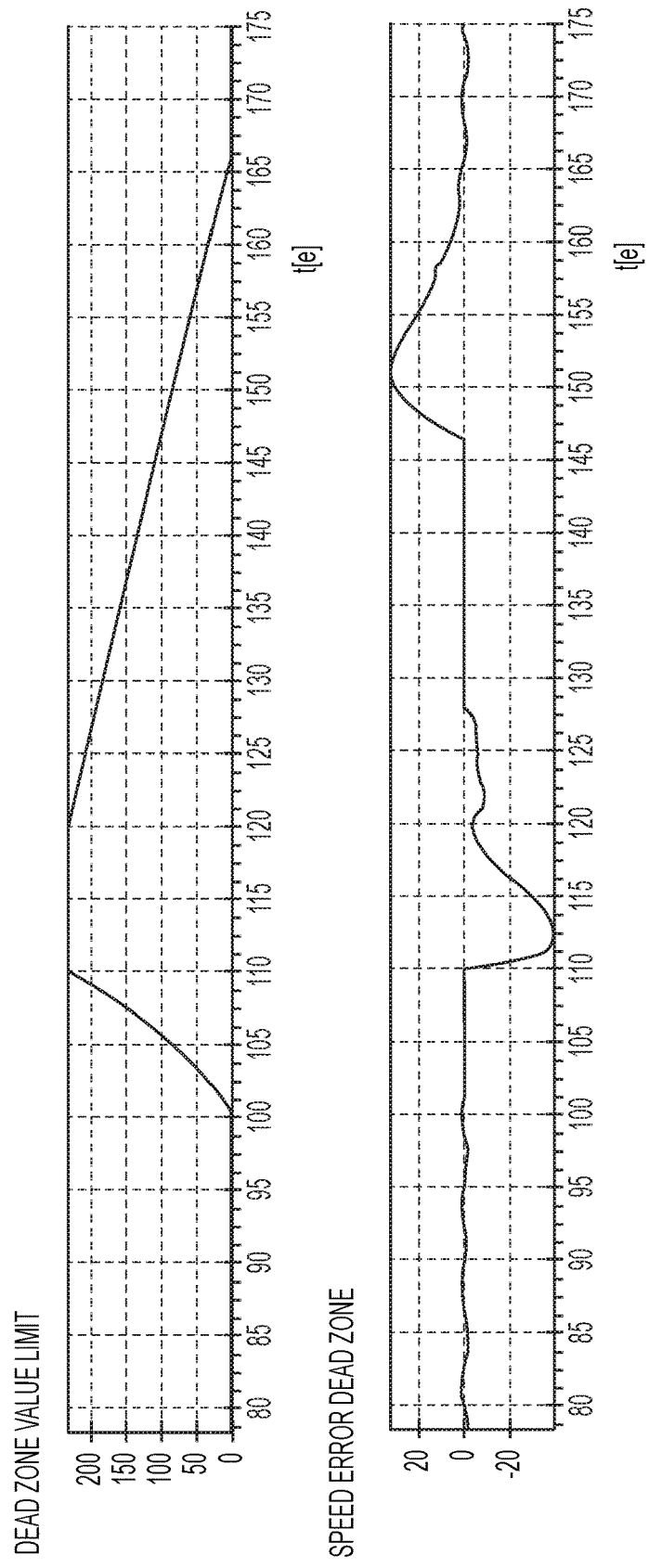
Figure 5:
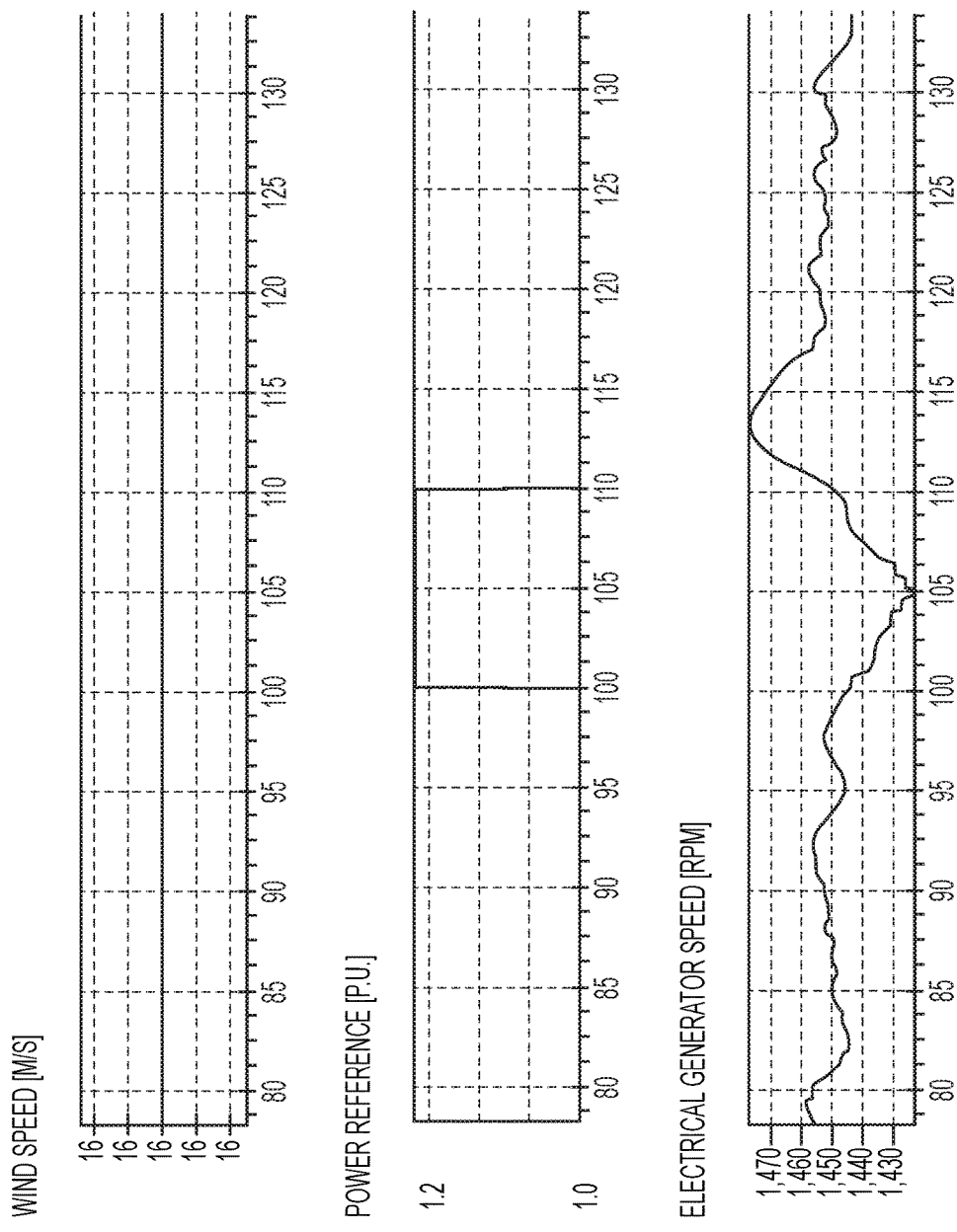
FIG. 5 shows simulations of the method according to the invention, above rated wind speed.
Figure 5:
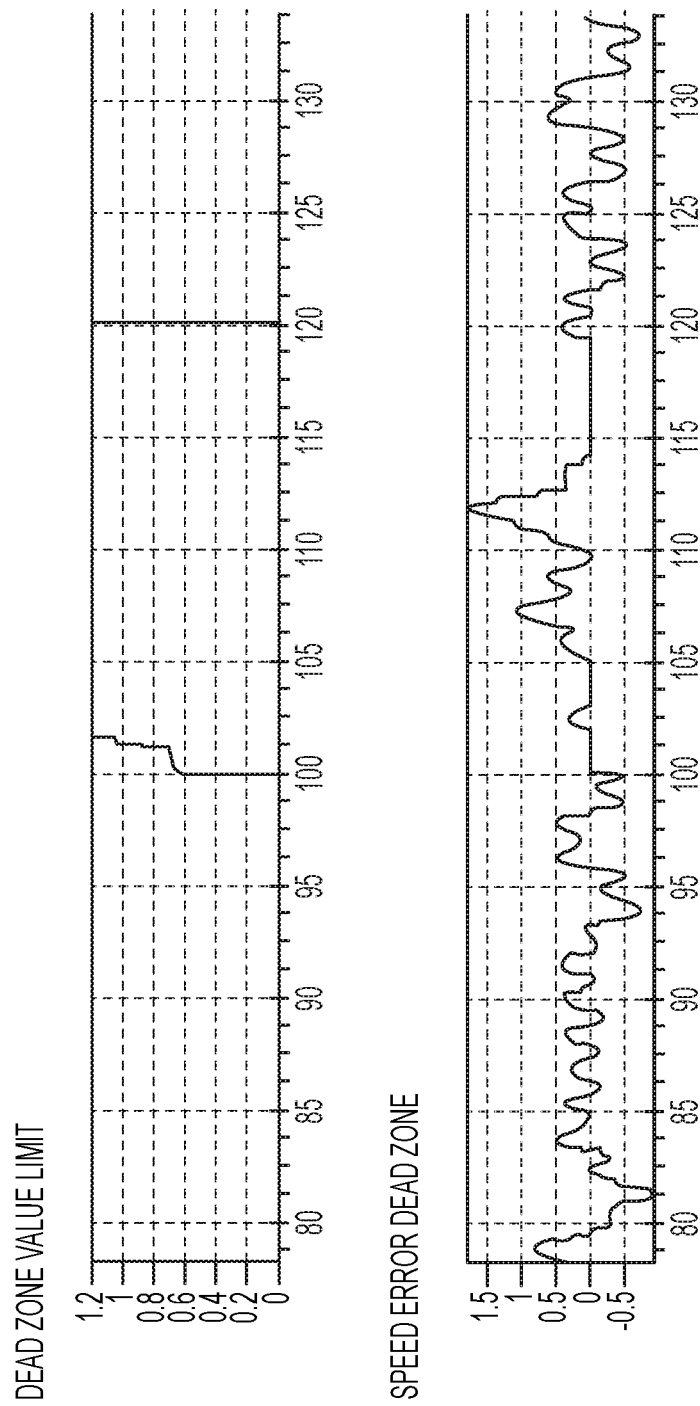

FIGS. 4 and 5 shows five different time dependent curves to illustrate the behaviour of the method using the dead zone. Each Figure shows the same signals from top to bottom, starting with actual wind speed, then the power reference, followed by the electrical generator speed (gear ratio is 110), and the forth curve shows the dead zone value limit set by the OverProduction logic block 303 of FIG. 3. The last curve shows the actual speed error signal send to the speed controller 302.

FIG. 4 show a situation with a simulation at 7 m/s. Boost 10% of rated power in 10 seconds, which is in the partial load area. The power reference is increased at time 100 second. The generator speed shows a quick response as the speed starts to drop, as a function of the dead zone value limit, which follows the speed error.

The generator speed error is out of bound after the boost period of 10 second, this can be seen in the bottom curve where the "generator speed error dead zone value" differ from zero, it can be seen that the PI-controller maintain the generator speed.

The "generator speed error" is in the input signal to the partial load controller 302 in FIG. 3.

FIG. 5 shows a simulation at 16 m/s, which is above rated wind speed, and thus in full load operation. Boost 10% of rated power in 10 seconds.

As the wind turbine is operated in full load there is only slight influence on generator speed. The speed starts to drop a little at time 100 seconds until 105 seconds, where the pitch controller of the wind turbine captures the speed drop and a time 110 seconds the speed is back to normal speed, as it was prior to the boost event. After the boost event at time 110 second the speed increases a little as the power boost has ended.

The presented Figures shows how the method, when implemented, behaves when a power boost is requested.

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims. Any range or device value given herein may be extended or altered without losing the effect sought, as will be apparent to the skilled person.

Embodiments of invention can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of controlling a wind turbine, wherein the wind turbine comprises a rotor connected to a generator, a rotational speed controller configured to control a speed of the rotor in response to a generator speed reference, and a power controller to control electrical power production, the method comprising:
    receiving a boost command to request a power boost event, so to increase the electrical power production, and
    imposing a dead band with a dead zone value limit to the rotational speed controller, wherein the dead band imposes:
    a zero signal to be sent to the rotational speed controller when a speed error is within the dead zone value limit, and
    an error signal to be sent to the rotational speed controller when the speed error is greater than the dead zone value limit, the error signal being a function of the speed error and the dead zone value limit.

2. The method according to claim 1, wherein the dead zone value limit is a variable value.

3. The method according to claim 2, wherein the dead zone value limit is a function of the speed of the rotor.

4. The method according to claim 3, wherein a function of the dead zone value limit is set in relation to the boost command.

5. The method according to claim 1, wherein the wind turbine further comprises a pitch system configured to adjust a pitch angle of a blade of the rotor, and wherein the method further comprises:

adjusting the pitch angle of the pitch system to control one or both of the speed of the rotor and the electrical power production.

6. The method according to claim 1, wherein receiving the boost command comprises:
   receiving a request for increased power production,
   calculating the dead zone value limit based on an actual generator speed and at least one other parameter, and
   passing the request for increased power production to the power controller.

7. The method according to claim 1, further comprising:
   returning the wind turbine gradually to a normal operational mode by increasing the speed of the rotor.

8. The method according to claim 7, wherein the dead zone value limit is held for a predetermined period of time before the speed of the rotor is ramped back to follow a speed reference without the dead band.

9. The method according to claim 8, wherein the predetermined period of time is in a range of 2 seconds to 15 seconds.

10. The method according to claim 8, wherein the speed of the rotor is ramped back at a predetermined ramp rate.

11. The method according to claim 10, wherein the predetermined ramp rate is in a range of 0.025 RPM/s to 0.2 RPM/s.

12. The method according to claim 7, wherein returning the wind turbine to the normal operational mode is triggered by a boost stop command signal.

13. A control system for a wind turbine arranged to receive a boost command to request a power boost event, the wind turbine comprising a rotor connected to a generator configured to generate electrical power dependent on a power reference and the boost command, the control system comprising:
   a rotational speed controller arranged to control a speed of the generator, based on a speed error,
   wherein a dead band block within the rotational speed controller is arranged to impose, responsive to the boost command, a dead band with a dead zone value limit, wherein the dead band block is arranged to output:
   a zero signal when the speed error is within the dead zone value limit, and
   an error signal when the speed error is greater than the dead zone value limit, where the error signal is a function of the speed error and the dead zone value limit.

14. A wind power plant comprising a power plant controller and at least one wind turbine with the control system according to claim 13, the power plant controller being arranged to send a power set point to the at least one wind turbine, wherein the power set point includes one of an increased power reference and a boost command.

15. A non-transitory computer program product loadable into an internal memory of a processing device, the computer program product comprising software code portions for performing an operation for controlling a wind turbine, the wind turbine comprising: a rotor connected to a generator, a rotational speed controller configured to control a speed of the rotor in response to a generator speed reference, and a power controller to control an electrical power production, the operation comprising:
   receiving a boost command to request a power boost event, so to increase the electrical power production, and
   imposing a dead band with a dead zone value limit to the rotational speed controller, wherein the dead band imposes:
   a zero signal to be sent to the rotational speed controller when a speed error is within the dead zone value limit, and
   an error signal to be sent to the rotational speed controller when the speed error is greater than the dead zone value limit, the error signal being a function of the speed error and the dead zone value limit.

* * * * *